United States Patent [19]

Lusk

[11] Patent Number: 4,689,244
[45] Date of Patent: Aug. 25, 1987

[54] ULTRASONICALLY SPEEDED FIBER IMPREGNATION

[75] Inventor: Donald I. Lusk, Mequon, Wis.

[73] Assignee: A. O. Smith Corporation, Milwaukee, Wis.

[21] Appl. No.: 860,788

[22] Filed: May 8, 1986

[51] Int. Cl.$^4$ ............................................. B05D 3/12
[52] U.S. Cl. .................................... 427/57; 427/387; 427/389.7; 427/434.4; 427/434.6; 427/443.2
[58] Field of Search ....................... 427/57, 387, 389.7, 427/434.4, 434.6, 443.2

[56] References Cited

U.S. PATENT DOCUMENTS

| | | | |
|---|---|---|---|
| 3,098,370 | 7/1963 | Poole | 68/3 |
| 3,246,055 | 4/1966 | Pendleton | 264/23 |
| 3,513,016 | 5/1970 | Wood et al. | 117/62 |
| 3,649,358 | 3/1972 | Johnston . | |
| 3,870,551 | 3/1975 | Iwami et al. | 117/115 |
| 4,157,420 | 6/1979 | Bourrain et al. | 428/392 |
| 4,388,129 | 6/1983 | Oizumi et al. | 156/73.1 |
| 4,450,197 | 5/1984 | Hager | 427/387 X |

Primary Examiner—Bernard D. Pianalto
Attorney, Agent, or Firm—Andrus, Sceales, Starke & Sawall

[57] ABSTRACT

A method of ultrasonically treating a fibrous strand for subsequent use in high speed filament winding operations. The strand, composed of a multiplicity of filaments such as glass or carbon, is initially coated with a silane-type binder which is dried onto the surface of the filaments. The strand is then passed at a high speed through a bath of thermosetting resin, and while submerged in the resin is subjected to ultrasonic energy. The ultrasonic energy increases the rate of interaction of the binder and resin, thereby increasing the wetting rate of the individual filaments. This permits saturation of an individual strand or a group of strands with the resin in a much shorter contact time and guarantees removal of all entrained air in the bundle. At the same time, it provides a more stable resin-fiber bond after curing.

10 Claims, 1 Drawing Figure

ULTRASONICALLY SPEEDED FIBER IMPREGNATION

BACKGROUND OF THE INVENTION

In conventional filament winding operations, a strand of fibrous material such as glass or carbon, is continuously passed through a bath to impregnate it with liquid resin. The fully impregnated strand can then be filament wound or otherwise fabricated into an article such as a pipe or a tube. After a curing reaction, the resin solidifies and forms an integral composite structure with the fibers which contains little or no entrained air to interfere with load transfer between these components.

The fibrous strand used in such winding operations consists of multiple substrands or filaments. For complete impregnation, it is essential that all of the individual filaments are fully coated with resin during passage through the path. If filaments are incompletely coated, air spaces or voids result during filament winding which cause significant loss of mechanical properties. Total impregnation is difficult because there are normally from 50 to 100 filaments per strand which are tightly intertwined together, and the viscous resin cannot readily penetrate this mass.

The degree of fiber impregnation is related to the rate of resin absorption into the fibrous bundle. Resin is absorbed by capillary action as it wets the filament surfaces and displaces the air inside the bundle. Above some critical speed, impregnation decreases as fiber speed through the bath increases. The resin does not have time to be absorbed into the bundle. The vastly dissimilar polarities of the fibers and resins cause poor wetting (surface absorption) of the liquid on the filaments which then reduces the capillary pressure drawing resin into the fiber bundle. The rate of impregnation is therefore relatively slow, and longer contact times are required to saturate the bundle. Certain fibers, such as carbon, are wetted even less than glass by the resin. These strands have lower capillary pressures and require even more contact time for complete resin impregnation of the bundle. Voids are much more prevalent in these cases than for glass strands.

The most frequently used method of improving the impregnation degree is with chemical binders. These complex molecules contain two different chemical polarities. One polarity is attracted to the inorganic surfaces and is easily absorbed onto the strands. The other has a high affinity for the organic liquids and is easily dissolved by the resin. The binder is coated onto the filaments in a separate step during strand manufacture and dried in place to insure it is not physically rubber off during fiber handling. When this strand is passed through a resin bath, the resin easily dissolves the organic end of the binder, allowing the resin to absorb onto the strand surface more completely than for uncoated fibers. Capillary pressure inside the bundle is increased, forcing resin into the bundle at higher rates. For similar contact times of resin and fibers, higher degrees of impregnation then result.

Another advantage of chemical binders is their ability to increase the stability of the resin-fiber bond after curing. Poor fiber wetting causes a low cohesive energy of the cured resin to the fibers which reduces bond stability. More polar molecules, such as moisture, then easily displace the solid resin from the strand by hydrolysis. Chemical binders, because of their different polarities matched to both the resin and fibers, hold these components together with higher cohesive energies. Thus, bond disruption by hydrolysis and heat is effectively retarded.

Ultrasonics has been used to increase the rate of chemical interactions of various materials. For example, it allows soldering of dissimilar metals by driving molecules from one surface into the other and providing efficient mixing and joining of the combination. Ultrasonics greatly increases the rate of electroplating operations by increasing the interaction of the liquid plating solution with the solid electrode or workpiece to be coated. Ultrasonics has also been used to increase the interaction of glass and resin. In that application, bare fibers are subjected to ultrasonic energy as they pass through a resin bath to eliminate air entrapped in the bundle. Ultrasonics increases capillary action by effectively mixing entrapped air from the fiber bundle with the liquid resin, thus improving impregnation degree. This procedure is used only where binders are not effective or practical. Ultrasonics is not used in conventional filament winding operations because bond permanence is not improved, as with binders. Further, binders permit maximum resin impregnation or saturation of the fibers without the expensive ultrasonic energy.

With improvements in process technology, faster winding speeds have become possible to increase production rates. While binders provide satisfactory impregnation at conventional fiber speeds, under 200 feet per minute, at higher speeds reduced resin absorption begins to occur with consequent loss of mechanical properties. At such high speeds, contact time of the resin and strand is reduced to less than 0.35 seconds which does not allow sufficient time for the dried binder to be redissolved by the resin as is necessary before it can improve the wetability of the strand. Such behavior is analogous to chemical detergents (molecules with similar bipolar structures to binders) which must be dissolved in water before they can emulsify oils or dirt. Thus, production efficiency of filament winding operations is now limited by the relatively slow impregnation rate of the fiber bundles even when they are coated with binders.

SUMMARY OF THE INVENTION

The present invention is directed to a method of increasing the impregnation rate of fibrous strands with resin so as to permit higher speeds in filament winding operations than are now possible. This is turn will permit increased production efficiency, especially with the new automated robotic winding systems under development. In particular, the invention is most effective where fiber speeds through the resin bath are greater than 200 ft. per minute and contact times are less than 0.35 seconds.

In accordance with the invention, the fibrous strand composed of either glass or carbon filaments is initially coated with a common binder such as silane, siloxane, or epoxy bipolar molecule, and the binder is dried onto the filaments. The coated strand is then passed through a bath of thermosetting resin. While submerged in this resin bath, the strand is subjected to ultrasonic energy having a frequency of 15 to 25 Kc per second. The ultrasonic energy increases the rate of interaction between the binder and resin by activating the surface molecules of the binder and causing them to be dissolved at a higher rate than normally expected. This permits the resin to impregnate the strand at higher rates, and full saturation of the strand bundle occurs in much shorter contact times.

A significant aspect of this invention is that bonds formed between the filaments and the resin are much more stable after curing to moisture and heat than those from ultrasonic impregnation alone, as previously described in patent literature. This is because the invention uses ultrasonics to activate the binder rather than to emulsify air pockets entrapped in the fiber bundle. Thus, the invention permits filament winding at speeds over 200 feet/minute with maximum impregnation of the strands and environmentally stable fiber-resin bonds after curing. Neither ultrasonics nor binders alone can produce both of these advantages.

Another important aspect of the invention is that several strands can be combined into a single unit and passed through the resin bath at high speeds. Because of the exceptional wetting of the ultrasonically activated binder, capillary pressure is great enough to force resin throughout this thick bundle even at short contact times of 0.35 second or less. Thus, production winding efficiency can be further increased by completely impregnating several strands simultaneously as a single unit. Such units passing through the resin bath cause much less turbulence, especially at high speeds, than several individual strands, and thus minimize air entrained in the resin which is ultimately transferred to the strands and part being filament wound.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
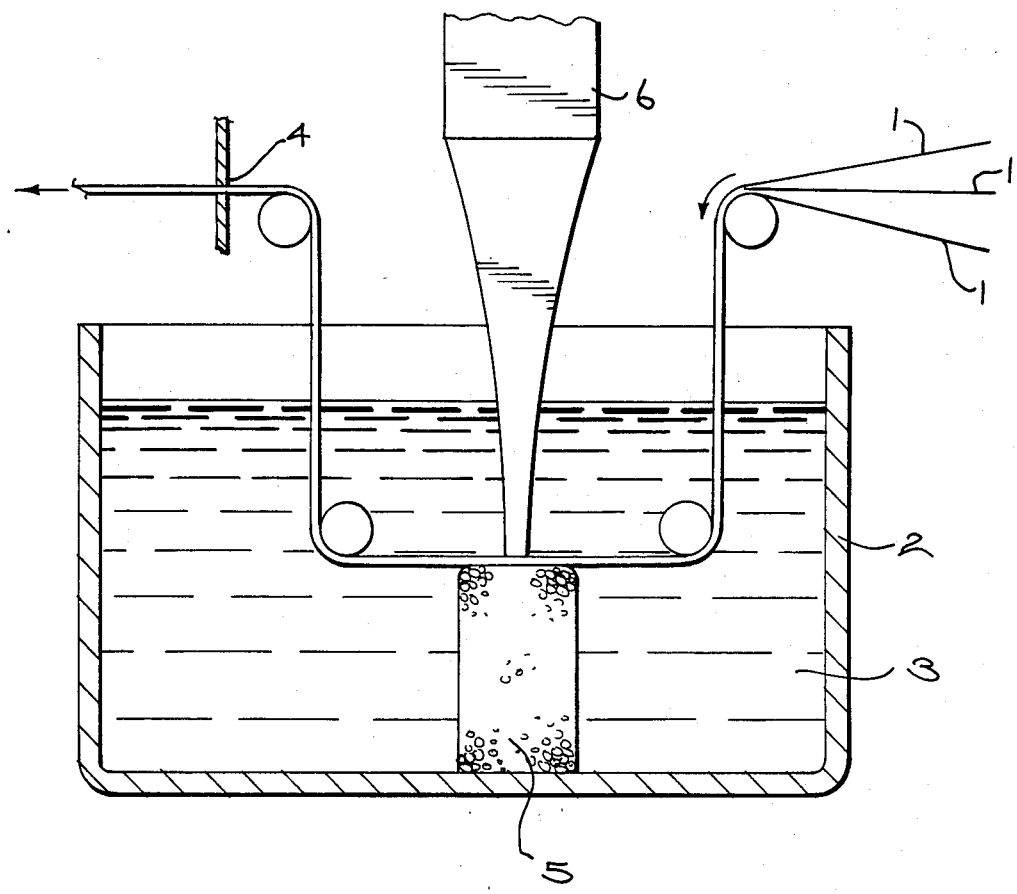
FIG. 1 is a schematic view showing the manner in which a group of fibrous strands are combined and treated ultrasonically during high speed passage through a resin bath.

The drawing illustrates schematically an apparatus for impregnating a group of fibrous strands 1 with a thermosetting resin. The strands 1 are fed into the open upper end of a vessel 2 containing a quantity of a thermosetting resin 3, and the strands are discharged through an orifice 4 which is sized so that excess resin on the outer surfaces of the strands will be wiped free and returned to the bath.

Each of the strands 1 consists of a multiplicity of substantially continuous filaments composed of glass or carbon. Single strands or a group of several strands together can be treated in the same manner to further increase impregnation efficiency.

The resin 3 employed to impregnate strands 1 is any conventional thermosetting resin normally used in filament winding operations such as polyester resin, epoxy resin, and the like.

In accordance with the invention, the strands 1 are initially coated with a silane binder which was dried onto the individual filaments. The silane binder is a conventional type and when using glass filaments may take the form of aminopropyl triethoxy silicone or N-2-aminoethyl-3-aminopropyl trimethyl siloxane. With the use of graphite filaments, propyl trimethoxy silicone glycidyl ether (epoxy silicone) can be used as the binder.

As the strands 1 are passed through the vessel 2, they are subjected to ultrasonic energy while submerged in the resin. As shown in the drawing, the strands are passed between a resilient foam pad 5 and the tip of an ultrasonic horn 6. The pad 5 creates a resilient pressure to position the strands 1 against the horn 6 and yet not cause undue resistance to movement of the strands which could result in fuzzing or fraying of the filaments.

The strands 1 are passed through vessel 2 at a high rate of speed (over 200 feet per minute) which results in a contact time of the strands with the resin of less than 0.35 seconds. Even with this extremely short contact time, the ultrasonic energy increases the rate of reaction between the resin and binder so that the resin will fully wet the filaments of each strand and be strongly bonded to the individual filaments after curing.

The frequency of the ultrasonic vibrations is not critical, and it has been found that a frequency range of 15 to 25 Kc per second can be employed. It is important that the end of the horn 6 be as close as possible to the moving strand 1 to provide the desired increase in reaction rate. As previously noted, the foam pad 5 aids in positioning the strand against the tip of the horn, thus insuring good energy transfer between the two bodies.

To show the improvement in impregnation achieved through the method of the invention, a series of lengths of glass fiber strands pretreated with a binder were passed through a resin bath constructed similarly to that shown in the drawing and the amount of resin pick-up was measured. Similar tests were conducted under identical conditions but also utilizing ultrasonic energy in the resin bath to improve the impregnation. In the first test, eight inch lengths of fibrous glass bundles, each composed of three strands containing a multiplicity of glass filaments, were initially treated with a silane binder, N-2-aminoethyl-3-aminopropyl trimethyl siloxane, and the bundles containing the dried binder were then passed at a speed of 200 feet per minute through a bath of an epoxy resin (diglycidyl ether of bisphenol A, Epon 828), resulting in a contact time of approximately 0.35 seconds. The bath was maintained at room temperature.

In this test the average resin pick-up over the eight inch length for six sample bunldes was 0.072 gram.

In a second test, similar glass bundles coated with the same binder and passed through the resin bath at the same speed and contact time were also subjected in the bath to ultrasonic energy having a frequency of 20 Kc per second.

In this second test, the average resin pick-up over an eight inch length for six sample bundles was 0.174 grams, or an increase of 242 percent over the first group of samples which were not subjected to ultrasonic energy.

The above tests clearly indicate the unexpected improvement in impregnation achieved through use of the method of the invention.

The drawing is merely illustrative of an apparatus that can be employed to carry out the method of the invention, and it is contemplated that the resin bath as well as the ultrasonic mechanism can take various forms and configurations.

Various modes of carrying out the invention are contemplated as being within the scope of the following claims particularly pointing out and distinctly claiming the subject matter which is regarded as the invention.

I claim:

1. A method of producing a load-bearing product, comprising the steps of preimpregnating a fibrous strand containing a multiplicity of filaments with a silane binder to coat the filaments with said binder, drying the binder on said filaments, contacting the preimpregnated strand with a liquid resin capable of reacting with said binder, subjecting the strand while in contact with said resin to ultrasonic energy to thereby accelerate the reaction of said resin with said binder, removing the strand from contact with the resin, and thereafter fabricating the impregnated strand into a load bearing product having improved strength are moisture resistance.

2. The method of claim 1, and including the step of continuously passing the strand in contact with said resin.

3. The method of claim 2, and including the step of passing the strand in contact with said resin at a speed in excess of 200 feet per minute.

4. The method of claim 1, and including the step of maintaining said strand in contact with said resin for a period of less than 0.35 seconds.

5. The method of claim 1, wherein said ultrasonic energy has a frequency in the range of 15 to 25 Kc per second.

6. A method of producing a load bearing product, comprising the steps of preimpregnating a fibrous strand containing a multiplicity of filaments with an organic silane binder to coat the filaments with said binder, drying the binder on said filaments, continuously passing the strand in contact with a liquid resin capable of reacting with said binder, simultaneously subjecting the strand and said resin while said strand is passing in contact with said resin to ultrasonic energy to accelerate the chemical reaction of the binder and the resin to promote complete absorption of the resin into the strand, and thereafter fabricating the impregnated strand into a load-bearing product having improved strength and moisture resistance.

7. The method of claim 6, wherein said filaments are glass filaments and said binder is selected from the group consisting of aminopropyl triethoxy silicone or N-2-aminoethyl-3-aminipropyl trimethyl siloxane and mixtures thereof.

8. The method of claim 7, wherein said resin is an epoxy resin.

9. The method of claim 6, wherein said filaments are graphite and said binder is propyl trimethoxy silicone glycidyl ether.

10. A method of increasing the rate of impregnation of a fibrous strand containing a multiplicity of filaments and having an organic silane binder dried onto the surface of said filament during the continuous passage of said strand through a resin bath, comprising the step of simultaneously subjecting the strand and resin to ultrasonic energy to accelerate the chemical interaction of the binder and the resin to promote complete absorption of the resin into the strand and fix said resin to the surfaces of said filaments with a semi-stable chemical bond.

* * * * *